United States Patent [19]
Woods

[11] 3,755,686
[45] Aug. 28, 1973

[54] POWERPLEXER
[75] Inventor: Joseph M. Woods, Boulder, Colo.
[73] Assignee: The United States of America as represented by the Administrator of the National Aeronautics and Space Administration, Washington, D.C.
[22] Filed: May 31, 1972
[21] Appl. No.: 258,331

[52] U.S. Cl. .................. 307/18, 307/28, 307/29, 307/38
[51] Int. Cl. ............................................. H02j 1/06
[58] Field of Search .................. 307/18, 28, 29, 41, 307/38

[56] References Cited
UNITED STATES PATENTS
2,149,355  3/1939  Lundstrom ..................... 307/88 X
1,691,986  11/1928  Nyquist ........................ 321/DIG. 1
3,391,323  7/1968  Ikeda ................................ 321/5
3,430,073  2/1969  Leonard ..................... 321/DIG. 1
3,448,361  6/1969  Dinter ............................ 307/38
3,521,130  7/1970  Davis et al. .................. 307/41 X Primary Examiner—William M. Shoop, Jr.
Attorney—Marvin J. Marnock, John R. Manning et al.

[57]  ABSTRACT

For use in the distribution of DC power levels to loads which require different voltages, a circuit which is supplied with DC voltage levels and commutates pulses for timed intervals onto a pair of distribution wires. The circuit is driven by a command generator which places pulses on the wires in a timed sequence. The pair of wires extend to voltage strippers connected to the various loads. The voltage strippers each respond to the pulse DC levels on the pair of wires and form different output voltages communicated to each load.

15 Claims, 5 Drawing Figures

POWERPLEXER

The invention described herein was made by an employee of the United States Government, and may be manufactured and used by or for The Government of the United States of America for governmental purposes without the payment of any royalties thereon or therefor.

PRIOR ART 3,400,219          3,340,365

BACKGROUND OF THE INVENTION

In electronic systems, the required voltages for operation of many circuit components are usually obtained by supplying an AC input to a number of DC power supplies. The power supplies form voltages at many levels. The power supplies are then connected by means of a wiring harness to the various circuit components which require the indicated voltage levels. The circuit components may be scattered far and wide as in a computer system, special purpose control system, and the like.

The number of voltage levels required in a given system has increased somewhat recently to take advantage of new devices which are presently on the market. A representative case might incorporate a photomultiplier tube requiring DC levels in excess of 100 volts. It may also incorporate field effect transistors which typically operate at 5 volts DC. In addition, it may incorporate a substantial quantity of mixed transistorized circuitry of both NPN and PNP types. This may result in a requirement of both positive and negative voltages of perhaps 12 and 20 volts. Typically, one voltage is used as the collector voltage while the other voltage is used for various bias levels. The voltage levels required for a system may be numerous.

Quite often, an electronic system can be arranged completely in one cabinet or housing. Sometimes this is not possible and the various components of the system are scattered about. For instance, electronic components and subsystems in a spacecraft are located at a variety of places. In control systems, electronic components may be located in different cabinets or housings many feet from one another. The dispersion of the various components over an area requires the placement of individual power supplies at each component or the distribution of many DC levels from a central power supply. In the distribution of power from a central power supply to eight or 10 separate electronic subassemblies located at different points, a wiring harness is normally fabricated which incorporates a connector of some sort which connects to the power supply and numerous legs on the harness, each terminating in various plugs or sockets. The fabrication of the wiring harness is expensive. The incorporation of supply voltages in a wiring harness leads to the requirement that signal leads in the harness be shielded, thereby increasing labor and cost. In addition, the harness is terminated at many points with many shapes and types of plugs or sockets. The connection of many wires into a multiple terminal plug or socket is likewise expensive, requiring a substantial amount of hand labor. The bulk of the plugs and sockets and the wiring harness itself can become noticeable, particularly in cramped quarters.

The foregoing problems establish the need for reduction of the number of wires in a wiring harness. The present invention is intended to alleviate a requirement for the distribution of all DC voltages to an entire electronic system. The invention reduces the power distribution system to a pair of wires which extend from the power supply and connect in parallel to numerous electronic subassemblies which require different voltages.

SUMMARY OF THE INVENTION

The present invention is therefore summarized as providing a power distribution system which connects to a suitable power supply providing many DC levels. Typically, the power supply is provided with an AC input which is connected to several DC supplies. The DC supplies form output voltages which are then supplied to a commutator. The commutator is driven by a command generator which forms sequence or timed signals which gate on and off various segments of the commutator. The commutator is connected to a two-wire output and places time pulses of various DC levels on the two wires. The two wires extend to the various electronic subassemblies which require different DC levels. A voltage stripper is connected to the pair of wires and forms a DC output signal suitable for the various subassemblies.

DESCRIPTION OF THE PREFERRED EMBODIMENT

Figure 1:
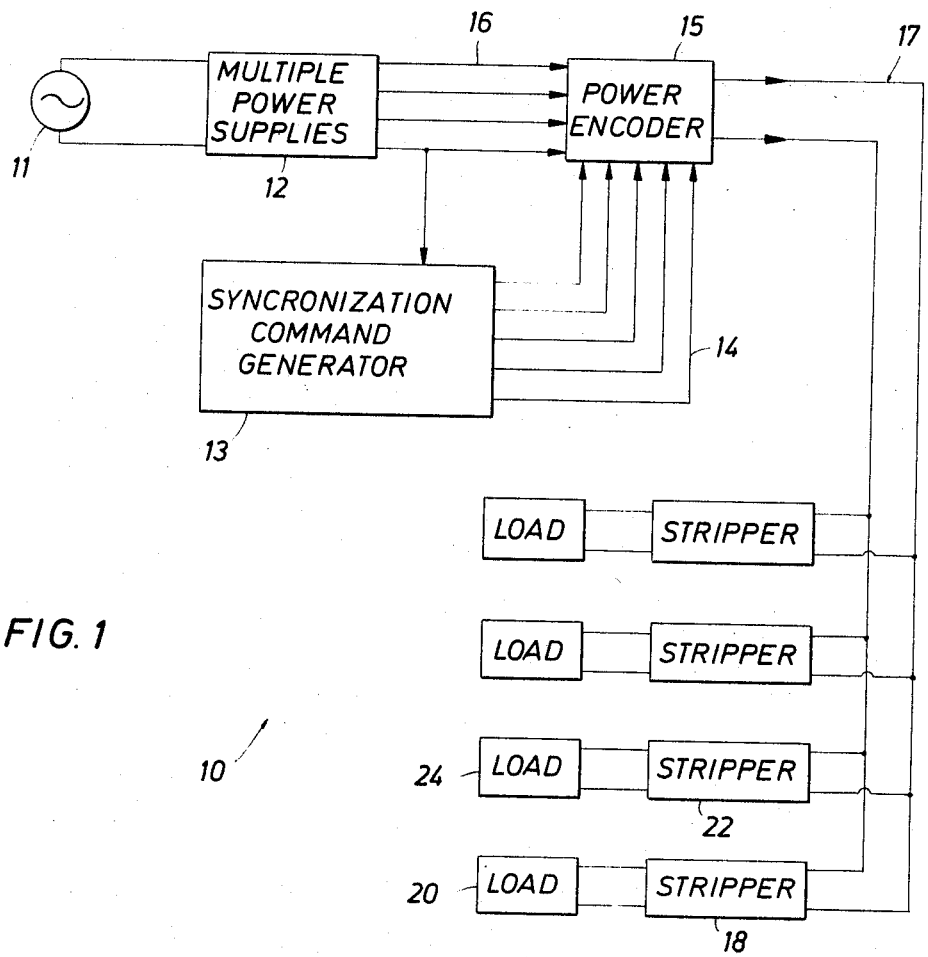
FIG. 1 is a block diagram schematic of the present invention.

Attention is first directed to FIG. 1 of the drawings where the power plexer system of the present invention is indicated by the numeral 10. FIG. 1 illustrates an AC source 11 which is connected with a number of power supplies 12. The number of power supplies may vary from two or more. The DC output levels of the various power supplies are subject to the requirements of the circuitry. The multiple power supplies shown in FIG. 1 are represented schematically inasmuch as their circuitry can be provided by one skilled in the art.

A synchronized command generator 13 is provided with a DC input to operate its circuitry and forms a number of gating signals which are outputed on a plurality of conductors 14. The gating signals are all supplied to a power encoder 15. The power encoder 15 functions somewhat in the manner of a commutator. It is provided with the DC power levels by a plurality of conductors 16. The conductors 16 are all connected to the encoder 15.

The commutator or encoder 15 forms an output signal on a pair of conductors indicated by the numeral 17. The pair of conductors is then routed through the wiring harness to the various and sundry electronic subassemblies which require DC input. Only two wires emerge from the power supply equipment and extend to the other subassemblies. The two wires furnish a multiplicity of DC levels. One of the two wires can be grounded, can be system ground, and to that extent, may be omitted from the wiring harness proper. Both wires are incorporated in FIG. 1 symbolically. The two wires thus extend to all points of consumption, and are the means of distribution of many DC levels throughout the system.

The two wires have a length of only a few inches to many feet. A voltage stripper 18 is connected to the two wires 17 and which provides a DC level to a load 20. The load 20 may comprise a single power consuming device or many circuit components. It is represented only schematically because it appears as a load for a particular DC level. By way of example and not limitation, suppose the load 20 incorporates a photomultiplier tube. Typically, such devices require voltage levels in the range of 100 volts or more. Thus the stripper 18 is connected to the two wires 17 and is provided with all of the pulsed DC levels thereon, but responds only to one level to form an output which is the requisite DC level, a level suitable for operation of the photomultiplier tube. The stripper 18 is uniquely associated with the particular load or subassembly which is connected to it. The load 20 may be in immediate proximity to other electronic subassemblies or may be remote from them.

The numeral 22 identifies a second voltage stripper which is connected to a load 24. The load 24 may require the same voltage input as the load 20 or a different voltage level. The arrangement of FIG. 1 incorporates several voltage strippers which are each connected to their respective loads which require DC inputs. The DC inputs may be all different or some may be duplicates.

While the foregoing describes the arrangement of the invention in general, attention is next directed to FIG. 2 of the drawings where the command generator 13 and the commutator 15 will be described in detail.

Figure 2:
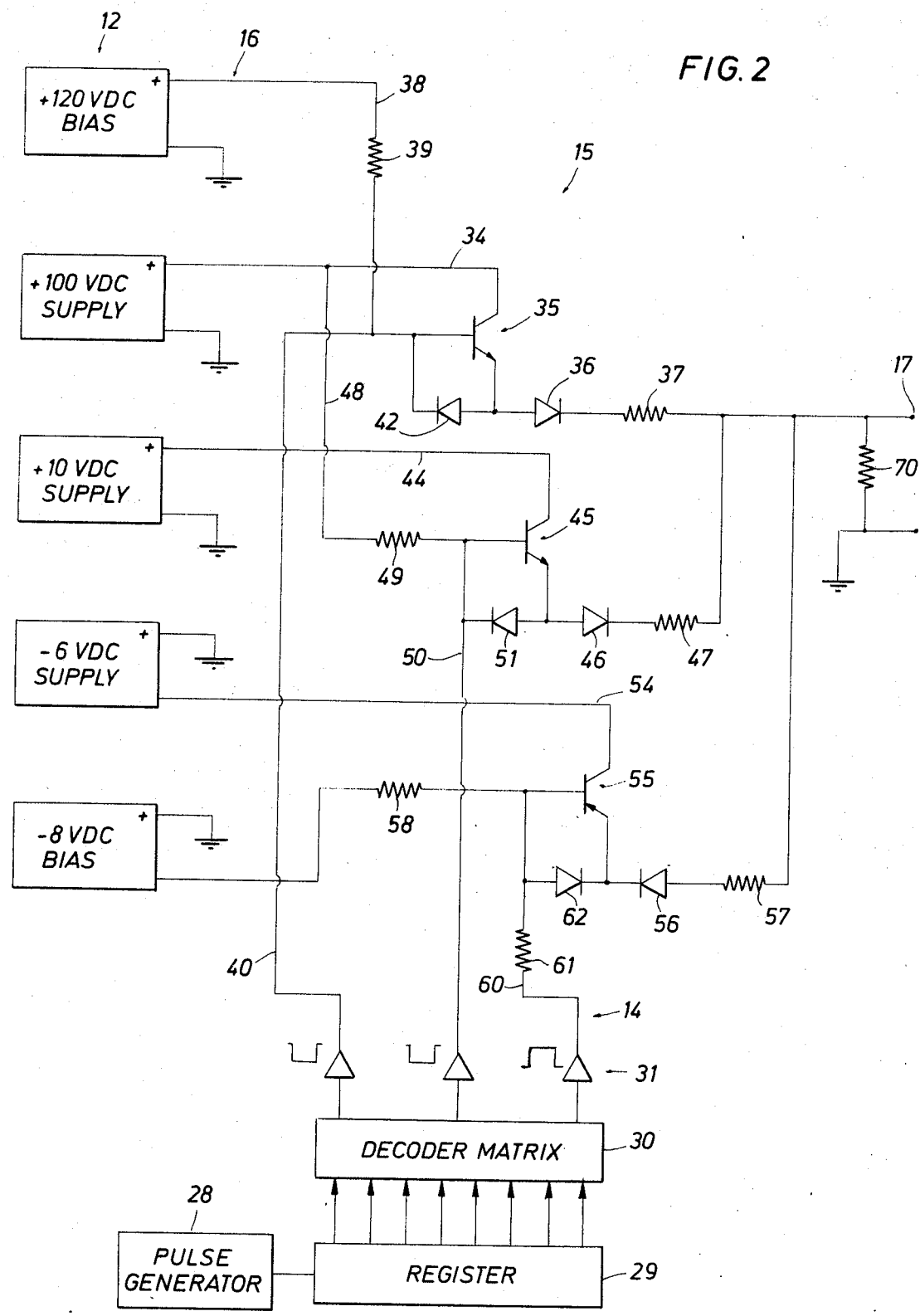
FIG. 2 is a detailed schematic of one form of a commutator including a command generator for controlling its operation.

In FIG. 2, several individual power supplies are indicated at 12. Specified voltages are shown which are representative but not a limitation on the present invention. Power supplies are shown providing DC voltages of perhaps 120 volts, 100 volts, 10 volts, and −6 volts. The command generator 13 is connected by a number of conductors 14 to the commutator to switch in the timed sequence.

The representative power supplies provide voltage levels of −6, −8, 10 and 100 volts DC. The 120 volt power supply and the −8 supply indicated in FIG. 2 are bias supplies used only in the commutator 15 as will be described. For a description of the circuitry of FIG. 2, attention is first directed to a pulse generator 28 which forms pulses which are supplied to a register 29. The count is advanced in the register, causing it to cycle and recycle indefinitely. The register assumes many states in its timed operation. The register 29 is connected to a decoder matrix.

The matrix 30 provides outputs to a number of amplifiers 31 connected to the conductors 14. The amplifiers 31 form driving signals which are placed on the conductors 14. The driving signals are timed with respect to one another, and they control the sequence at which specific voltages from the power supplies 12 are commutated onto the conductor 17. The timing or sequence of operation will be set forth hereinafter.

Attention is now directed to the 100 volt DC power supply. It will be observed that its negative output is grounded while its positive output is connected by means of a conductor 34 to a switching transistor 35. The emitter of the transistor 35 is connected to a diode 36 through a resistor 36 to the conductor 17. The transistor 35 is utilized as a switch. When it is in a conducting state, current flows from the power supply through the transistor, the diode, and resistor. The transistor switch 35 is biased normally on by means of a conductor 38 connected to a small dropping resistor 39 from the 120 volt DC bias supply. Any bias level can be used so long as it is sufficiently high to bias the transistor 35 on. In the representative voltage levels selected to FIG. 2, 120 volts is something more than 100 volts, and has been selected for this reason. The 120 volt power supply does not furnish an output level to the conductor 17.

The transistor switch 35 is biased normally on so that current flows from the power supply to the conductor 17. The numeral 40 identifies one of the conductors 14 which is connected to a driver amplifier 31 which is connected to the decoder matrix 30. A negative going signal is provided on the conductor 40 and supplied to the base of the transistor 35 to cut off current flow through the transistor. When a negative going signal is supplied to the base, the transistor 35 ceases to conduct. The base-emitter junction of the transistor is protected by means of a diode 42.

In examining the cicuitry associated with the transistor 35, it will be seen that current normally flows from the power supply through the switching transistor into the conductor 17. It is terminated only when a negative going pulse is applied to the base of the transistor from the command generator circuitry 13. The negative going pulse cuts off flow through the transistor. The timing of this operation will be set forth hereinafter.

A 10 volt power supply is incorporated as an example. The 10 volt power supply is connected by means of a conductor 44 to a transistor switch 45. The emitter is connected through a diode 46 and a series resistor to the conductor 17. It will be noted that the transistors 35 and 45 both are able to furnish DC power levels to the conductor 17. The transistor 45 is biased normally on by connection of a conductor 48 which is connected to some higher voltage level. In this case, it is convenient to use the 100 volt DC supply. It is not mandatory, and some other bias voltage source can be used. The conductor 48 is connected to the next higher voltage supply and the bias is provided through a dropping resistor 49. A diode 51 protects the base-emitter junction.

The transistor 45 is biased normally on. It is cut off only when a signal is provided on a conductor 50 which extends to a driver amplifier 31 which forms a negative going pulse under direction of the matrix 30 which cuts off conduction through the transistor 45. The transistor 45 is operated in a manner similar to the transistor 35. It is switched off by a negative going pulse from the command generator circuitry 13.

Attention is next directed to the negative supply. A conductor 54 extends from the negative supply to the collector of a switching transistor 55. Its emitter is connected by means of a series diode 56 and series resistor 57 to the conductor 17. The transistor 55 is normally biased on by virtue of the conductor which is connected to a dropping resistor 58 to the base from a bias source such as a more negative voltage. A positive going pulse switches the transistor 55 from a conductive to a non-conductive state. The positive going pulse is provided on the conductor 60 connected through a resistor 61 to the base. The base-emitter junction is protected by a diode 62. The transistor 55 functions in the same manner as those described before. It is normally conductive, but it is normally switched off by a positive going pulse.

Considering the cicuitry described to this point, the timing of the decode matrix will now be set forth. The decode matrix is appropriately wired to provide timing pulses which sequence the various portions of the commutator in the desired sequence. For example, it may be determined that the negative supply should furnish a negative pulse for one-fourth of an interval, the ten volt supply for one-half of a cycle, and the one hundred volt supply for one-fourth of a cycle. In this example, the register 29 is preferably a four-state counter. It counts through four states and then re-cycles. Its outputs are supplied to the matrix 30 which forms timing pulses with duty cycles of 25 percent, 50 percent, and 25 percent. Then the circuitry re-cycles. Using this example, it will then be observed that timing pulses in accordance with these duty cycles are provided to the transistors 35, 45 and 55. These transistors are switched, and being considered together, are commutated to provide pulses on the conductors 17 in this timed sequence. This therefore causes the circuitry to form pulsed DC levels on the conductor 17.

In the event that the conductor 17 is accidently opened, a high resistance load resistor 70 is connected from the conductor 17 to ground.

Figure 3:
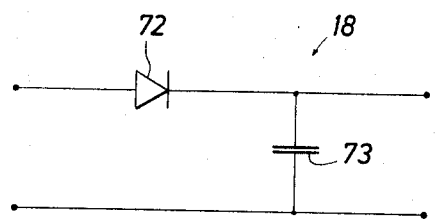
FIG. 3 is one type of voltage stripper for obtaining a specified DC level over a pair of wires furnished by the commutator of FIG. 2.

Attention is next directed to FIG. 3 which illustrates a form of voltage stripper 18. The voltage stripper is a diode rectifier circuit. It incorporates a diode 72 and a smoothing capacitor 73 is connected across the output. The circuitry is particularly adapted to strip off the highest voltage encoded on the conductor 17. Referring to the representative levels selected for FIG. 2, the maximum voltage is 100 volts DC. It is believed that the operation of the circuitry shown in FIG. 3 is readily understood by one skilled in the art. It is emphasized that the circuitry in FIG. 3 responds only to the topmost voltage. The lower levels on the conductor 17 are blocked by the diode action. While the diode 72 passes pulses to the voltage stripper 18, the output is smoothed by the capacitor 73. The output is not pulsating DC, but is a smooth DC level. There may be some drop in the output from the 100 volts provided at the input in pulsed form. This depends in large part on the size of the load and the relative size of the capacitor 73. If there is a relatively low current drain to the load and the capacitor is of substantial size, the output voltage of the stripper 18 will be steady at only a volt or so below the 100 volts input. The smoothness or filtering of the output voltage from the stripper 18 is not normally critical. In the event it is, the circuitry in FIG. 4 may be utilized as will be described.

Figure 4:
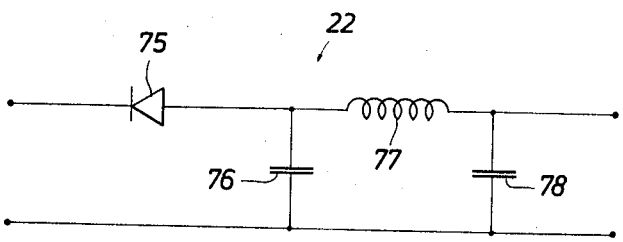
FIG. 4 is a schematic wiring diagram of a negative voltage stripper adapted to be connected by two wires to the power commutator illustrated in FIG. 2 of the drawings; and, FIG. 5 is a schematic wiring diagram of a voltage stripper which is connected to the two wire power distribution system originating with FIG. 2 and forming an output voltage level at some intermediate point between the minimum and maximum levels placed on the two wires.

In FIG. 4, a circuit is shown for stripping away the lowest voltage imposed on the conductor 17. It is a negative voltage diode rectifier. In FIG. 4, the numeral 22 generally identifies the voltage stripper. A diode 75 is connected to a smoothing capacitor 76. A series inductor 77 is incorporated and its output is connected to a second smoothing capacitor 78. In comparison with FIG. 3, the voltage stripper 22 provides substantial smoothing of the output level. Additional LC stages can be added to further enhance the smoothing capabilities.

The reverse polarity of the diode 75 in contrast with the diode 72 shown in FIG. 3 should be noted. The stripper 18 of FIG. 3 is adaptable for stripping off the highest voltage of the several voltage levels pulsed on the conductor 17. FIG. 4 illustrates a stripper for removing the lowest voltage on the conductor 17. It will be appreciated that no matter how many voltage levels are placed on the conductor 17, one course is the highest and another is the lowest, thereby permitting the use of voltage strippers such as those shown in FIGS. 3 and 4. These strippers function to reject all other voltage levels on the conductor 17. In this sense, they function as rectifier circuits.

The smoothness of the DC levels from the strippers 18 and 22 shown in FIGS. 3 and 4 is dependent on the circuit requirements. If a large amount of ripple can be tolerated, a minimum amount of capacitance in the capacitor 73 can be used. However, if a fairly well regulated DC level is required, it may be necessary to incorporate several LC stages as shown in FIG. 4.

The diodes 72 and 75 can be reversed in polarity as desired.

Figure 5:
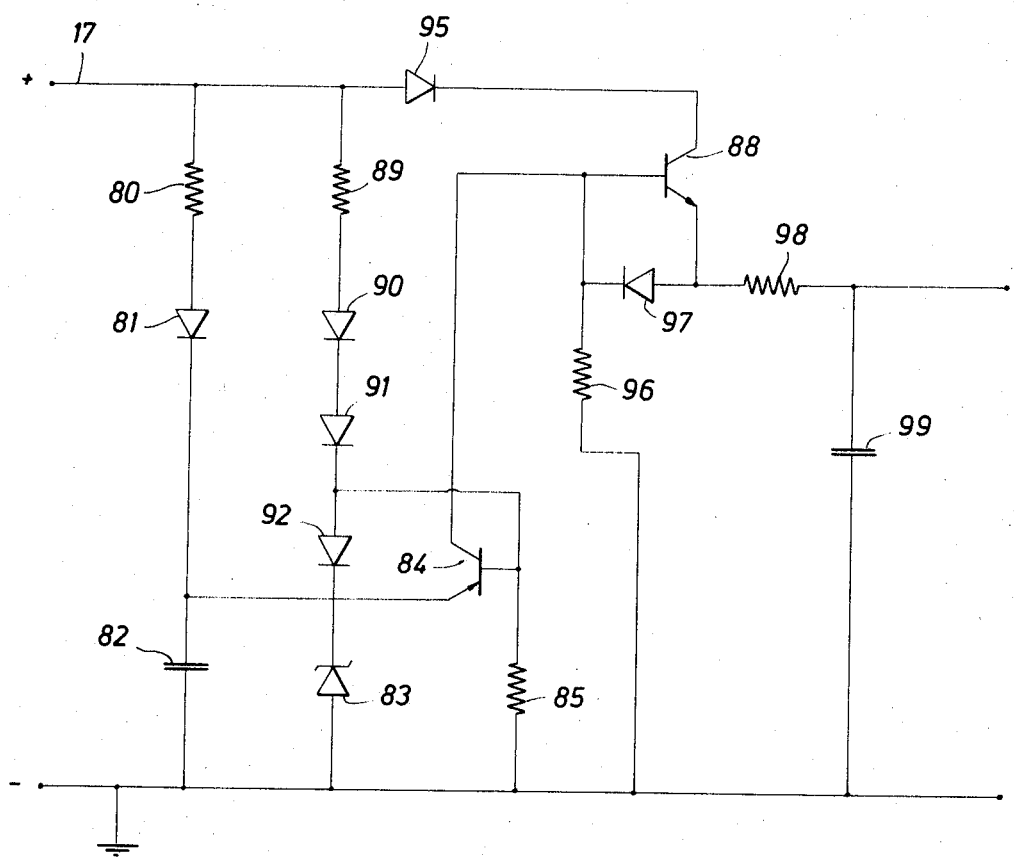

If only two voltage levels are imposed on the conductors 17, they can both be removed by means of peak voltage rectifiers of the sort illustrated in FIGS. 3 and 4. However, if there are intermediate voltage levels, another stripper is used. FIG. 5 illustrates a circuit which responds to intermediate voltage levels. The circuitry of FIG. 5 differs from that of FIGS. 3 and 4 in that it forms an output level dependent on one of the intermediate pulsed DC levels and rejects over-voltages. It is inherent that over-voltages will occur if the circuitry of FIG. 5 is responsive to only one of the intermediate levels.

In FIG. 5, the numeral 17 identifies the common conductor. It is the conductor on which the pulsed DC levels are found which may include a mix of positive and negative voltages. A current limiting resistor 80 is connected to a rectifying diode 81. The diode 81 charges a capacitor 82 to a positive level. As the charge escalates, the capacitor is discharged through a Zener diode 83. The Zener diode regulates the charge on the capacitor 82 to a reference level. Returning to FIG. 2 for a moment, it will be noted that a +10 volt DC power supply is incorporated and 10 volt pulses are placed on the conductor 17. The reference level for the capacitor 82 and the Zener diode 83 is about 9 volts, taking into account certain forward drops and series components as will be described. The circuitry of FIG. 5 responds to the 10 volt input pulses to form an output at approximately 9 volts. The capacitor 82 provides a reference level for a transistor 84.

The PNP transistor 84 has a grounded base through a resistor 85 while its collector is connnected by conductor 86 extending to a series transistor 88. More will be noted concerning this hereinafter.

A current limiting resistor 89 is connected to a series of diodes, including diodes 90, 91 and 92. A conductor 93 is connected at a mid-point of the string of diodes and is then connected to the base of the transistor 84. The base-emitter junction cannot swing by an amount more than the forward drop of the diode 92. However, by virtue of the use of a PNP transistor, when this voltage drop across the diode 92 occurs, it cuts off the transistor 82. Considering the voltage levels on the conductor 17, when a 100 volt pulse flows through the conductor 17, current flows through the resistor 89 and through the string of diodes. This provides a positive voltage on the base of the transistor 84 in comparison with the voltage at its emitter. This relative positive voltage at the base drives the transistor 84 into cut off. When the transistor 84 is cut off, it provides a signal on the conductor 86 to the base of the transistor 88 which drives that transistor into cut off.

FIG. 5. further incorporates a diode 95 which blocks the negative pulses on the conductor 17. Returning to FIG. 2, a negative voltage supply will be observed there. The negative pulses are blocked by the diode 95. Positive pulses on the conductor 17 flow through the conductor 17, the diode 95, and the transistor 88. The transistor 88 further incorporates a resistor 96 from the base to ground, a protective diode 97 preventing damage to the emitter-base junction and a series output resistor 98. Current flow charges the capacitor 99 which is connected to the output of the circuitry of FIG. 5.

Considering the operation of the circuitry of FIG. 5 in response to the multiple input levels on the conductor 17, the following should be noted. When the level on the conductor 17 is that to which the circuitry of FIG. 5 responds, the transistors 84 and 88 are both turned on. The diode 95 is forward biased to permit current to flow through it to the transistor 88. The transistor 88 is on to charge the capacitor 99. When an over-voltage condition exists, any voltage which exceeds the voltage to which the circuitry normally responds, the series resistor 89 conducts raising the bias at the base of the transistor 84, driving that transistor to cut off. When the transistor 84 is cutt off, it forms a signal for the transistor 88 which likewise cuts off that transistor. Thus, no current can flow through the transistor 88, and the over-voltage is not experienced at the emitter of the transistor or the charging capacitor 99. When an under-voltage occurs, any voltage which is less than that to which the circuitry normally responds, the diode 95 blocks conduction. The under-voltage exists at the anode of the diode, but the cathode is at a higher level due to the previously accumulated charge on the capacitor 99. In the event the under-voltage is still positive but not enough to cause current to flow through the diode 95, the transistor 84 may be on and provide an enabling signal to the transistor 88, but no conduction flows due to blocking by the diode 95. It will be noted that the circuitry of FIG. 5 therefore responds to the designated voltage level for its operation. The circuitry of FIG. 5 is adjusted by altering the value of the resistors 85 and 89.

The voltage stripper of FIG. 5 provides an output which is about 1 volt below the permitted input level. In the example used before, the input level is 10 volts DC, and the output is about 9 volts DC. It is relatively simple to increase the DC input level by modifying the power supplies 12 to overcome the one volt forward drop in the diode 95 and transistor 88. The resistor 98 is relatively small and tends to minimize parasitic oscillations. The capacitor 99 is sized dependent on the current drain and the smoothing function required for the output. Again, an LC filter can be attached to further smooth any ripple which may occur at the output of the voltage stripper of FIG. 5.

The mid-voltage stripper of FIG. 5 is intended for positive voltages and for use with a positive input which is also subject to higher positive input. If it is to be used for negative voltages, the polarity of the diodes 81, 83, 90, 91, 92, 95 and 97 is reversed. The transistor 84 then becomes an NPN while the transistor 88 becomes PNP. The negative counterpart of the circuitry shown in FIG. 5 functions in the same manner.

Preferably the system is protected in operation by termination of the conductor 17 in its characteristic impedance. Parasitic oscillations are preferably suppressed by the incorporation of the series resistors 37, 47 and 57 shown in FIG. 2. A minimum load resistor 70 is shown in FIG. 2 to protect the circuitry in the event of loss of the conductor 17 and all the loads connected thereto.

The synchronization command generator forms a repetitive sequence of pulses for timing purposes. If desired these pulses on the conductors 14 can be commutated by the encoder 15. For example, the encoder may form three gate signals of 25 percent duty cycle for the representative voltage levels −6, +8, and +100 as described above. The remaining 25 percent of the duty cycle may then be used to place timing pulses or small analog signals on the wires 17 which then distribute the signals to various points. Timing signals or analog signals have a range of about ±5 V. They therefore do not pass the voltage stripper 18 and 22. The small signals are gated through a commutating transistor similar to those shown at 35, 45 or 55 in FIG. 2, and can be detected and utilized by small signal responsive circuits such as the voltage stripper of FIG. 5. The voltage stripper would be modified by omission of the storage capacitor on the output and the use of components built for small current levels.

A less expensive version to be suggested is the use of an AC source and omission of the commutator. In other words, the voltage strippers would then respond to an AC input which would then have to be smoothed. This arrangement is appropriate if the DC regulation is fairly imprecise, and requires the use of larger filter components. The nature of the load will more readily determine the use of an AC input and a DC output which is not regulated as well as through the use of the circuit shown in FIG. 1.

The foregoing is directed to the preferred embodiment. The scope of the invention is determined by the claims which are appended hereto.

I claim:
1. A circuit for providing a multiplicity of DC levels to power consuming loads utilizing a pair of wires, comprising:
 first and second power supplies forming DC voltage levels which are different from one another;
 circuit means connected to said first and second power supplies, said means having a pair of wires serving as an output therefrom with one of said output wires being the system ground and said first and second power supplies being grounded thereto, said circuit means including commutator means connected to said output wires and having as inputs conductors connected to said power supplies, and timed means connected to said commutator means for periodically operating said commutator means to place first one DC voltage level on said output wires and then another DC voltage level on said output wires from said first and second power supplies; and first and second circuit means connected to said pair of wires and each being adapted to be selectively connected to a load which respectively requires power from said first and second power supplies and operable on the different DC voltage levels therefrom, said first and second circuit means forming output DC voltage levels for the loads wherein the DC voltage levels are different from one another, and are provided thereto continuously from the timed pulses on said pair of wires.

2. The circuit of claim 1 wherein said commutator means includes switching means with an input terminal adapted to be connected to one of the input conductors;

an output terminal connected to said switching means; and, a control terminal thereon adapted to be connected to said timed means for operating said switching means to selectively connect said output terminal to said input terminal.

3. The circuit of claim 2 wherein said switching means includes a switching transistor and said transistor has a base which is connected to a bias voltage source.

4. The circuit of claim 3 wherein said transistor is connected at its collector to one of said input conductors and has an emitter which is connected to said output wires.

5. The circuit of claim 4 including in said emitter circuit a diode and series resistance.

6. A circuit for providing a multiplicity of DC levels to power consuming loads utilizing a pair of wires, comprising:

first and second power supplies forming DC voltage levels which are different from one another;

circuit means connected to said first and second power supplies, said means having a pair of wires serving as an output therefrom, said means further placing timed pulses of voltage levels on said wires from said first and second power supplies; and first and second circuit means connected to said pair of wires and each being adapted to be selectively connected to a load which respectively requires power from said first and second power and operable on the different DC voltage levels therefrom, said first and second circuit means forming output DC voltage levels for the loads wherein the DC voltage levels are different from one another, and are provided thereto continuously from the timed pulses on said pair of wires, said first circuit means including a positive peak voltage rectifier circuit.

7. A circuit for providing a multiplicity of DC levels to power consuming loads utilizing a pair of wires, comprising:

first and second power supplies forming DC voltage levels which are different from one another;

circuit means connected to said first and second power supplies, said means having a pair of wires serving as an output therefrom, said means further placing timed pulses of voltage levels on said wires from said first and second power supplies; and, first and second circuit means connected to said pair of wires and each being adapted to be selectively connected to a load which respectively requires power from said first and second power supplies and operable on the different DC voltage levels therefrom, said first and second circuit means forming output DC voltage levels for the loads wherein the DC voltage levels are different from one another, and are provided thereto continuously from the timed pulses on said pair of wires, said first circuit means including a negative peak voltage rectifier circuit.

8. A circuit for providing a multiplicity of DC levels to power consuming loads utilizing a pair of wires, comprising:

first and second power supplies forming DC voltage levels which are different from one another;

circuit means connected to said first and second power supplies, said means having a pair of wires serving as an output therefrom, said means further placing timed pulses of voltage levels on said wires from said first and second power supplies; and, first and second circuit means connected to said pair of wires and each being adapted to be selectively connected to a load which respectively requires power from said first and second power supplies and operable on the different DC voltage levels therefrom, said first and second circuit means forming output DC voltage levels for the loads wherein the DC voltage levels are different from one another, and are provided thereto continuously from the timed pulses on said pair of wires, said first circuit means having a pair of output terminals with a storage capacitor thereacross.

9. A circuit for providing a multiplicity of DC levels to power consuming loads utilizing a pair of wires, comprising:

first and second power supplies forming DC voltage levels which are different from one another;

circuit means connected to said first and second power supplies, said means having a pair of wires serving as an output therefrom, said means further placing timed pulses of voltage levels on said wires from said first and second power supplies; and, first and second circuit means connected to said pair of wires and each being adapted to be selectively connected to a load which respectively requires power from said first and second power supplies and operable on the different DC voltage levels therefrom, said first and second circuit means forming output DC voltage levels for the loads wherein the DC voltage levels are different from one another, and are provided thereto continuously from the timed pulses on said pair of wires, said first and second circuit means being positive and negative peak voltage rectifier circuits, respectively.

10. A circuit for providing a multiplicity of DC levels to power consuming loads utilizing a pair of wires, comprising:

first and second power supplies forming DC voltage levels which are different from one another;

circuit means connected to said first and second power supplies, said means having a pair of wires serving as an output therefrom, said means further placing timed pulses of voltage levels on said wires from said first and second power supplies; and, first and second circuit means connected to said pair of wires and each being adapted to be selectively connected to a load which respectively requires power from said first and second power supplies and operable on the different DC voltage levels therefrom, said first and second circuit means forming output DC voltage levels for the loads wherein the DC voltage levels are different from one another, and are provided thereto continuously from the timed pulses on said pair of wires, said first circuit means including a peak voltage rectifier and a series component responsive to excessive voltage which means blocks excessive voltage from said peak voltage rectifier circuit.

11. The circuit of claim 10 wherein said series component includes
a switch means;
excessive voltage detection means forming a signal supplied to said switch means;
said switch means being operable to selectively open and close;
a storage capacitor on the output of said peak voltage rectifier for being charged thereby; and,
said excessive voltage detection means opening and closing said switch means on the occurrence of excessive voltage.

12. The circuit of claim 11 wherein said switch means includes a series connected transistor having a base at which an input control signal switches said transistor off and on.

13. The circuit of claim 11 wherein said peak voltage rectifier includes a series diode.

14. A circuit for providing a multiplicity of DC levels to power consuming loads utilizing a pair of wires comprising:
first and second power supplies forming DC voltage levels which are different from one another;
circuit means connected to said first and second power supplies, said means having a pair of wires serving as an output therefrom, said means further placing timed pulses of voltage levels on said wires from said first and second power supplies for a defined duty cycle;
first and second circuit means connected to said pair of wires and each being adapted to be selectively connected to a load which respectively requires power from said first and second power supplies and operable on the different DC voltage levels therefrom, said first and second circuit means forming output DC voltage levels for the loads wherein the DC voltage levels are different from one another, and are provided thereto continuously from the timed pulses on said pair of wires; and,
a third circuit means for placing a digital signal on said wires during a specified portion of the duty cycle.

15. A circuit for providing a multiplicity of DC levels to power consuming loads utilizing a pair of wires comprising -
first and second power supplies forming DC voltage levels which are different from one another;
circuit means connected to said first and second power supplies, said means having a pair of wires serving as an output therefrom, said means further placing timed pulses of voltage levels on said wires from said first and second power supplies for a defined duty cycle;
first and second circuit means connected to said pair of wires and each being adapted to be selectively connected to a load which respectively requires power from said first and second power supplies and operable on the different DC voltage levels therefrom, said first and second circuit means forming output DC voltage levels for the loads wherein the DC voltage levels are different from one another, and are provided thereto continuously from the timed pulses on said pair of wires; and,
a third circuit means for placing an analog on said wires during a specified portion of the duty cycle.

* * * * *